Aug. 23, 1955     R. H. H. BARR     2,715,814
FUEL-FLOW FOR PLURAL RADIAL INWARD-FLOW GAS TURBINES
Filed March 13, 1950     9 Sheets-Sheet 1

Inventor
Richard H. H. Barr
By
Stevens Davis, Miller & Mosher
His Attorneys

Aug. 23, 1955  R. H. H. BARR  2,715,814
FUEL-FLOW FOR PLURAL RADIAL INWARD-FLOW GAS TURBINES
Filed March 13, 1950  9 Sheets-Sheet 3

Aug. 23, 1955           R. H. H. BARR           2,715,814

FUEL-FLOW FOR PLURAL RADIAL INWARD-FLOW GAS TURBINES

Filed March 13, 1950           9 Sheets-Sheet 4

Inventor
Richard H. H. Barr
By
Stevens, Davis, Miller & Mosher
his Attorneys

Aug. 23, 1955 R. H. H. BARR 2,715,814
FUEL-FLOW FOR PLURAL RADIAL INWARD-FLOW GAS TURBINES
Filed March 13, 1950 9 Sheets-Sheet 6

Inventor
Richard H. H. Barr
By
Stevens, Davis, Miller & Mosher
Attorneys

Aug. 23, 1955 R. H. H. BARR 2,715,814
FUEL-FLOW FOR PLURAL RADIAL INWARD-FLOW GAS TURBINES
Filed March 13, 1950 9 Sheets-Sheet 7

Fig. 12.

Inventor
Richard H. H. Barr
By
Stevens, Davis, Miller & Mosher
his Attorneys

Aug. 23, 1955  R. H. H. BARR  2,715,814
FUEL-FLOW FOR PLURAL RADIAL INWARD-FLOW GAS TURBINES
Filed March 13, 1950  9 Sheets-Sheet 8

United States Patent Office 2,715,814
Patented Aug. 23, 1955

2,715,814

FUEL-FLOW FOR PLURAL RADIAL INWARD-FLOW GAS TURBINES

Richard H. H. Barr, Ashford, England, assignor of one-half to Centrax Power Units Limited, Brentford, England, a British company Application March 13, 1950, Serial No. 149,355

Claims priority, application Great Britain March 25, 1949

12 Claims. (Cl. 60—39.16)

This invention relates to an open cycle gas turbine plant of the kind comprising a compressor delivering compressed gas (usually air) to a combustion system where it is heat-energised by the burning of fuel, and hot gas so produced is either expanded in a turbine which drives the compressor and also supplies external shaft power, or alternatively is expanded in a turbine which drives the compressor and in a rotationally independent turbine which supplies the external shaft power, the turbines being arranged, as respects the flow of working fluid, either in series (with either turbine first) or in parallel.

A main object of the invention is the provision of a gas turbine plant having a good part-load performance, more particularly a plant of an order of power suitable for the propulsion of road vehicles or small marine craft.

The prime movers of road vehicles usually operate at or near full load conditions for short periods only, and run most of the time at low or medium loads, and so a gas turbine power plant for road vehicle propulsion having poor part-load performance (which involves relatively high fuel consumption at low loads) is not an economical proposition for normal use.

To obtain improved part-load performance in gas turbine engines, it is desirable for the pressure ratio of the compressor and the maximum cycle temperature to be kept as high as possible when the power output is reduced. A substantial improvement in this sense can be achieved if, when the supply of fuel for combustion is reduced, an appropriate reduction (for any given rotational speed of the compressor) is made in the quantity of working fluid taking part in the cycle (which quantity is usually known as the "mass flow"), for example by the use of variable-admission nozzle means (or the equivalent) to vary the admission of working fluid to the turbine or turbines. The present invention proposes to provide a plant in which the power output is controlled in this manner. As explained below, any such plant, for satisfactory operation demands a compressor which is capable of functioning stably (i. e. in a surge-free manner) over a wide range of mass flow variation at any given rotational speed, up to the maximum (or, alternatively expressed, at any pressure ratio up to the maximum).

To explain the nature of the present invention more clearly reference will now be made to the first three figures of the accompanying drawings, in which.

Figure 1:
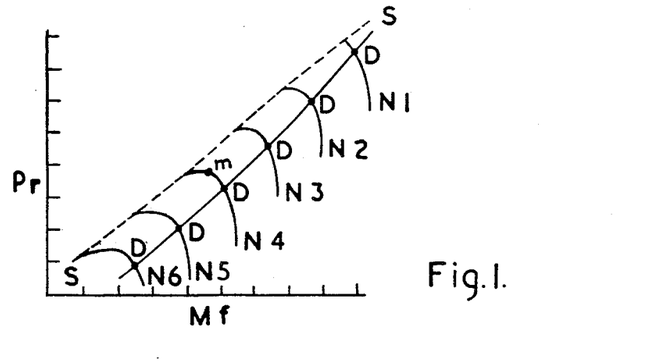
Figure 1 is a graph showing the characteristic lines (or "characteristics") of a normal centrifugal compressor, i. e. the graphic lines representing the relationship between pressure ratio, mass flow and rotational speed.

In Figure 1 pressure ratio (P. R.) is plotted against mass flow (M. F.) for a series of rotational speeds $N_1$–$N_6$, $N_1$ being full speed. The characteristics shown are relatively "humped" in shape, each having a point of maximum pressure ratio (such as $m$ for speed $N_4$) on each side of which the characteristics fall with increase or decrease of mass flow. At the higher speeds the point of maximum pressure is theoretical, since it falls on the left of the surge line. The downward slope on the left of the point $m$ is known as the positive slope, that on the right as the negative slope. As is well known in the art, the region of positive slope is inherently unstable, and continued reduction of M. F. for a given speed results in the unstable flow known as surging. The points on each characteristic at which surging is liable to commence are connected by the line S (the surge line). Taking the mass flow range between the compressor operating line (the line connecting the design points D) and the surge line as representing the range of mass flow over which the compressor will give stable operation at a satisfactory pressure ratio, it will be seen that at the higher speeds and pressure ratios this range is relatively small. In an average case it is, at full speed, of the order of 5% of the complete mass flow range between zero and full speed design point, and only at the lower speeds and pressure ratios does it reach the order of 20–25% of the same complete range. Such a compressor would be entirely unsuitable for a plant according to the present invention, and axial flow compressors suffer from similar disadvantages.

The present invention provides an open cycle gas turbine power plant of the kind referred to, wherein the compressor is of such nature that at all pressure ratios up to and including the designed full pressure ratio it can operate stably over a mass flow range extending at least down to 50% of the mass flow at the full pressure ratio design point; and the turbine (or both of them) is (or are) of the radial-vane centripetal flow type; and the plant also includes a power output control system comprising the combination of means for varying the quantity of fuel supplied for combustion and means for imposing on the plant (when the fuel supply for combustion is varied) an appropriate variation in mass flow in the sense which tends to maintain the maximum cycle temperature and pressure as high as possible, which latter of the two said means is associated with the gas entry to the turbine (or, where there is a rotationally independent shaft power turbine, is associated with the gas entry to either turbine or comprises separate elements each associated with the entry to one of the turbines) and acts to vary the quantity of gas admitted to the turbine rotor channels (or to the rotor channels of either or both turbines, as the case may be).

The expression "radial-vane centripetal flow turbine" is herein used to include cases where the rotor vanes are "backswept" or "forward-swept" from the truly radial direction and also cases in which the generally centripetal direction of the fluid through the passages defined by the vanes is made up of a radial (or near-radial component) and a substantial axial component (e. g. the case of "mixed-flow" or "diagonal flow" turbines).

The invention is more usefully applicable to a plant in which the external shaft power is delivered by an independently rotatable turbine and therefore, within its above defined broad scope, the invention provides an open cycle gas turbine plant of the kind referred to comprising a compressor of such nature that at all pressure ratios up to and including the designed full pressure ratio it can operate stably over a mass flow range extending at least down to 50% of the mass flow at the full pressure ratio design point, a compressor-driving turbine, an independently rotatable turbine for delivering external shaft power, both turbines being of the radial-vane centripetal flow type, and a power output control system comprising the combination of means for varying the supply of fuel for combustion and means for imposing on the plant (when the fuel supply for combustion is varied) an appropriate variation in mass flow in the sense which tends to maintain the maximum cycle temperature and pressure as high as possible, which latter of the two said means comprises variable-area nozzle means (or the equivalent), association with the entry to each turbine, operable to vary the quantity of gas admitted to the turbine rotor channels.

Preferably the said two means are so interconnected that operation of a single control member effects the properly related variation of fuel and mass flow. It should here be remarked that radial-vane centripetal flow turbines are very suitable for variable nozzle control, since variation of the nozzle area does not too adversely affect the angle of incidence of the gas on the turbine vanes.

The characteristic lines of a compressor capable of stable operation over the mass flow range required by the invention are (at least over the major part of the region between design point at any speed and zero flow) relatively flat compared with those shown in Figure 1. The degree of flatness depends upon the operating range of the particular compressor, and the characteristics necessarily always fall to the right of design point, as the "choking region" is approached. It is preferable to use a compressor which can operate stably over substantially the entire available mass flow range, and in this case the characteristics would be free from positive slope (Figure 2 referred to below provides an illustration of what is meant).

Figure 2:
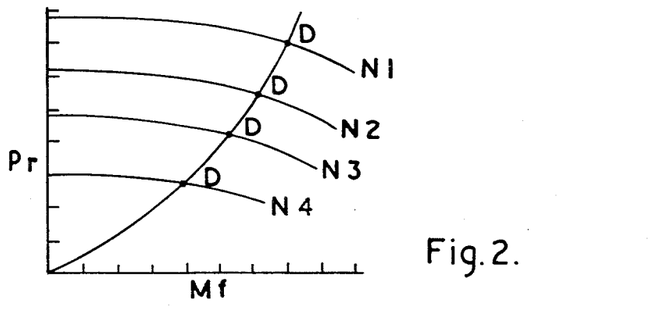
Figure 2 is a graph showing specimen characteristic lines for a centrifugal compressor with a vaneless annular diffuser space.

One variety of compressor capable of the required performance is a centrifugal compressor of which the impeller discharges radially into an appropriately designed free diffuser space of annular form having a constant radial dimension (not followed by diffusing passages comprising guide vanes). This construction though well known for industrial blowers of relatively low pressure ratio, is believed to be an innovation for the gas turbine field, which requires compressors capable of working at pressure ratios ranging from about 2:1 upwards. It is believed that the best results will be secured if the outer radius of the free diffuser space is at least one and one half times the extreme tip radius of the impeller. Figure 2 shows the characteristic lines of a suitably designed example of this variety of compressor. The free diffusing space, if of suitable dimensions, may be followed by a secondary diffuser comprising diverging passages (formed by guide vanes in association with an enclosing casing).

Figure 3:
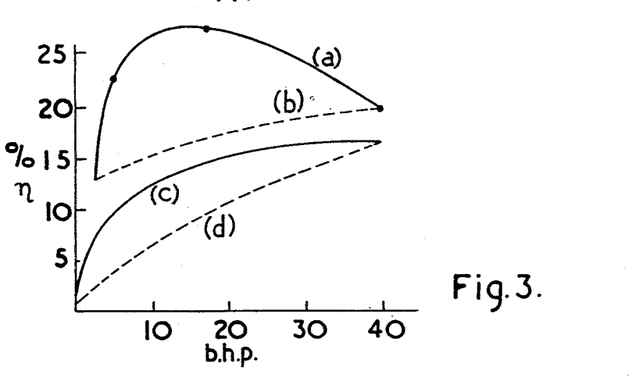
Figure 3 is a graph of overall efficiency plotted against load for the case of a 40 B. H. P. engine designed according to the present invention and also, for purposes of comparison, for the case of a typical known gas turbine plant for the production of shaft power.
Figure 4:
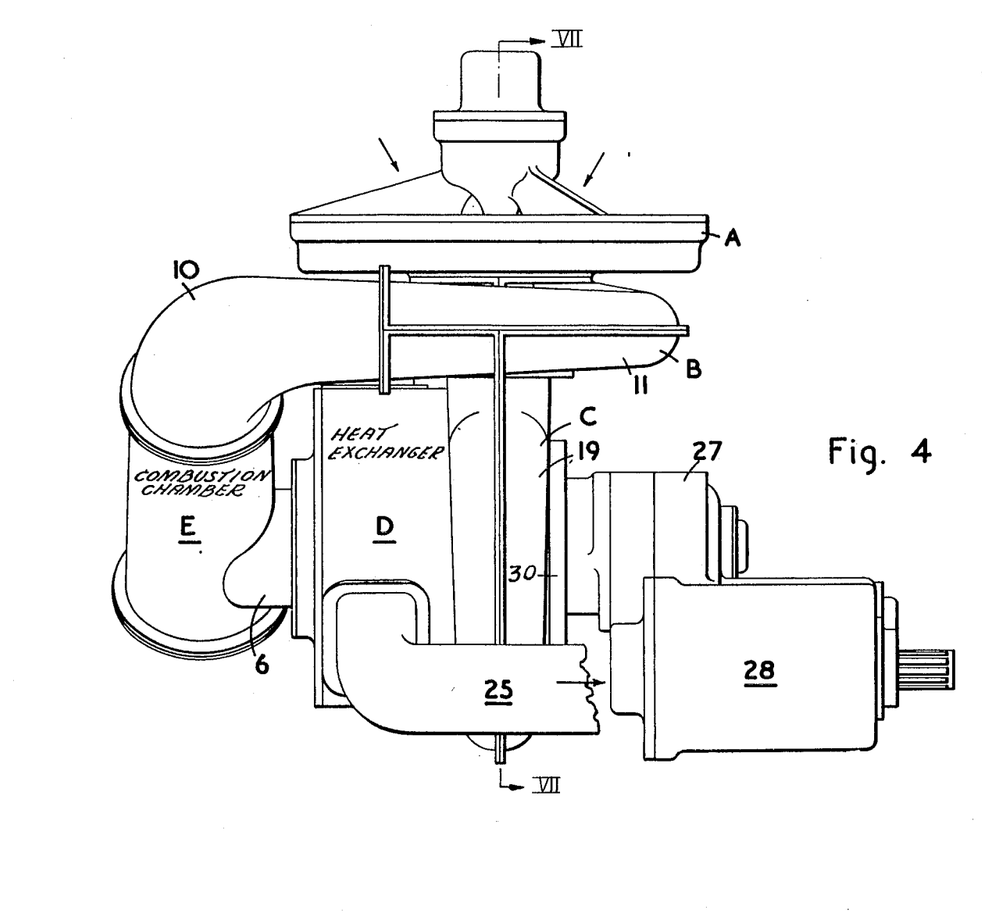
Figure 4 is a view of the engine from one side.
Figure 5:
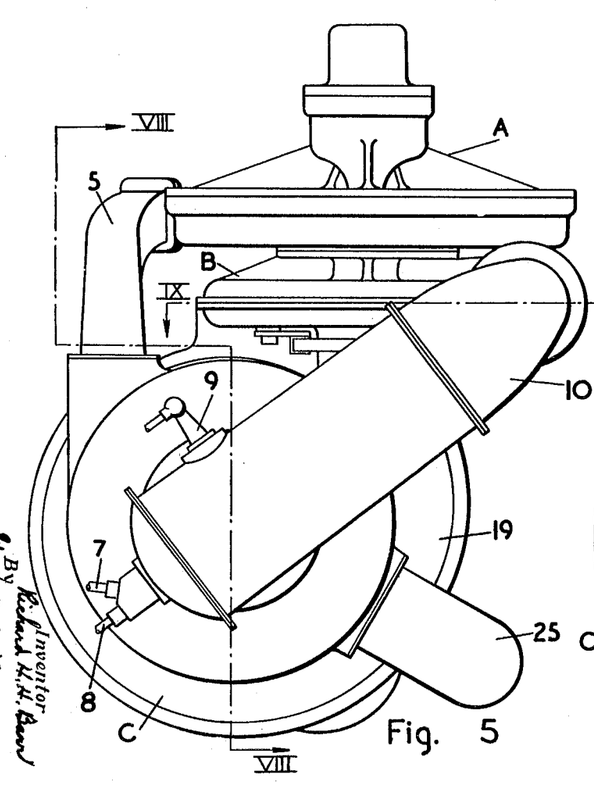
Figure 5 is a front view (i. e. from the left of Figure 4).
Figures 6, 9:
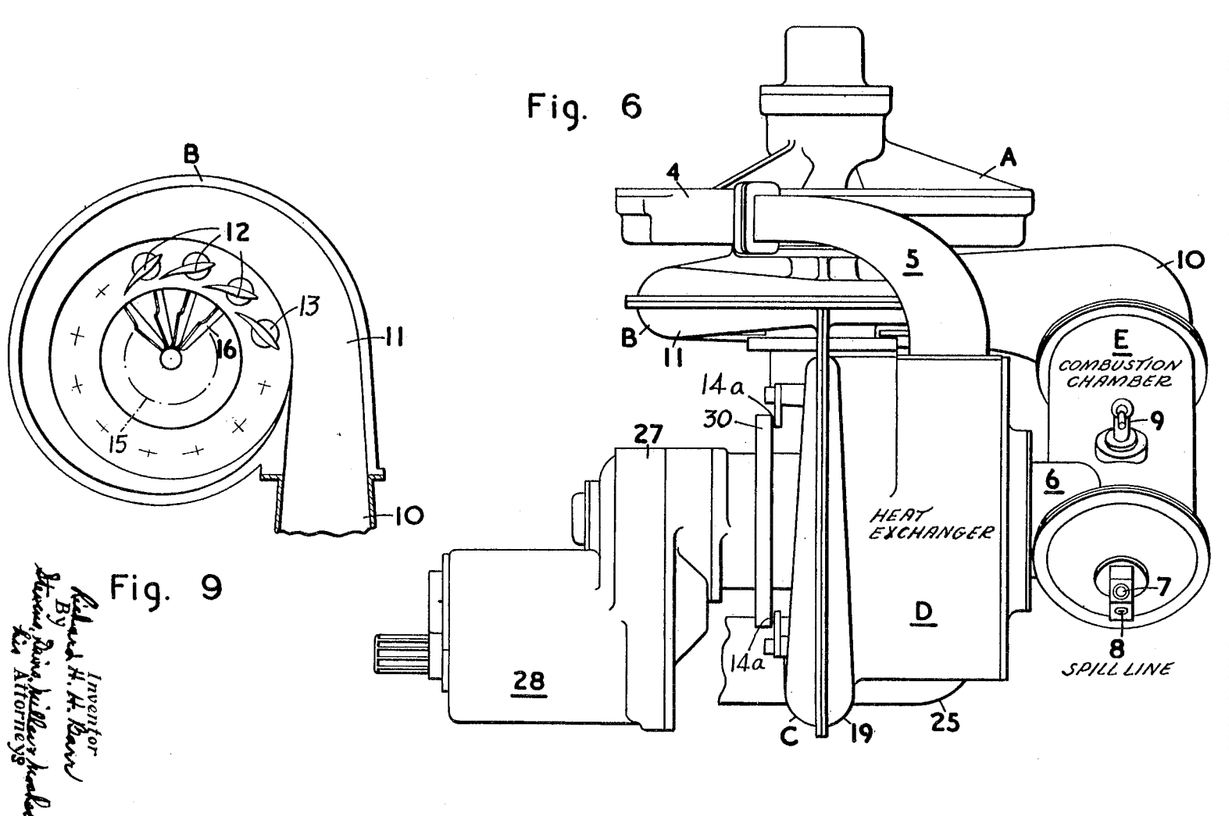
Figure 6 is a view on the other side.
Figure 9 is a section on the line IX—IX of Figure 5.
Figure 7:
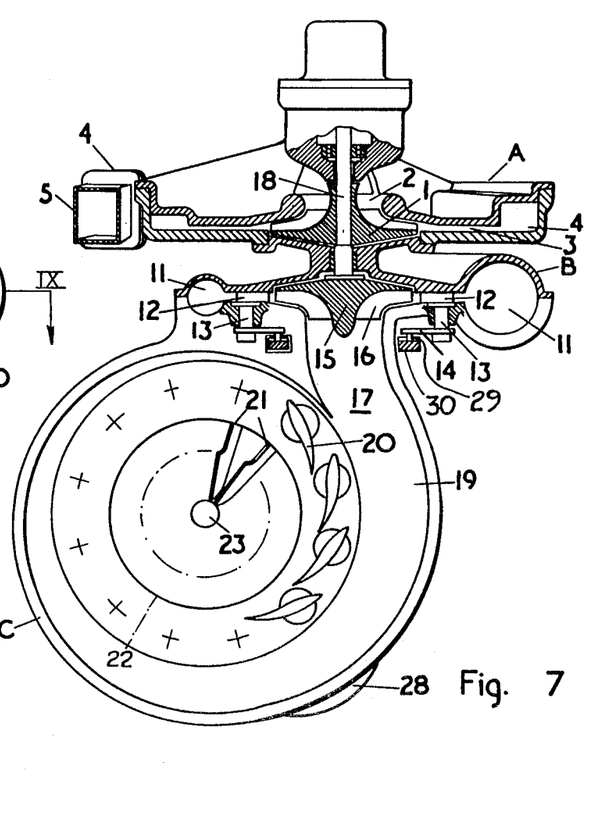
Figure 7 is a section on the line VII—VII of Figure 4.
Figure 8:
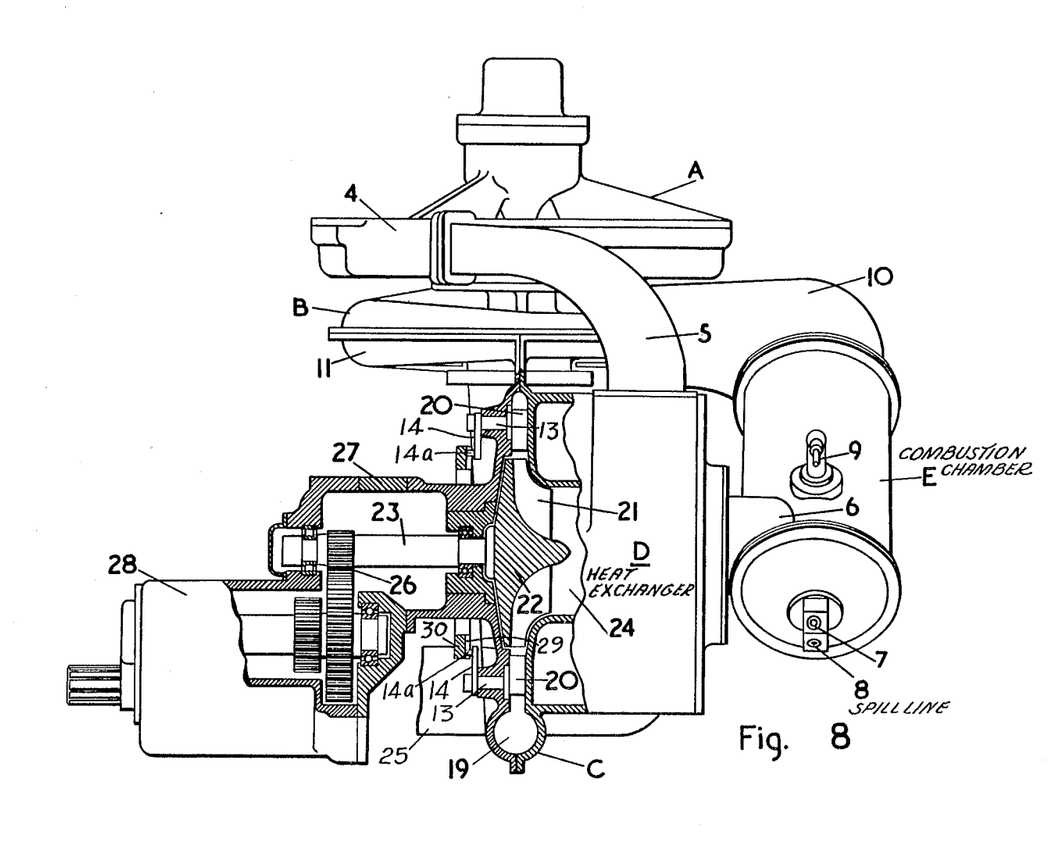
Figure 8 is a section on the line VIII—VIII of Figure 5.

The practical value of the present invention is clearly illustrated by Figure 3, which shows overall thermal efficiency ($\eta$) plotted against load (B. H. P.) for the following cases:

(a) A 40 B. H. P. design of plant according to the present invention embodying a heat exchanger.

(b) A hypothetical plant of the same power, with heat exchanger, but of orthodox design in that it has a centrifugal compressor with normal vaned diffuser, and power output is varied by fuel control alone.

(c) As for (a), but without a heat exchanger.

(d) As for (b), but without a heat exchanger.

The relatively high efficiency given by (a) and (c) at low load, compared with (b) and (d) will be observed.

It is also believed possible to use as an alternative variety of compressor a centrifugal compressor of which the impeller discharges directly into a diffuser comprising diverging passages constituted (in association with an enclosing casing) by a series of guide vanes which are adjustable to vary the cross-sectional area and configuration of the said passages if provision is made for the automatic adjustment of the said vanes step-by-step with the variation in mass-flow brought about by variable-nozzle or equivalent means.

Although the specific varieties of compressor mentioned above as suitable for embodiment in a plant according to the present invention are all of the aerodynamic type (by which is meant those acting on the principle of the transfer of kinetic energy from a rotor to a steady flow of air, with subsequent conversion of kinetic to pressure energy), the use of a suitable compressor, if there be such, acting on a different principle is not excluded.

Moreover, in this specification the expression "compressor" includes the case of a multi-stage compressor (a plurality of compressors of any variety previously mentioned, arranged to act in series on the working fluid) of which the overall pressure ratio/mass flow characteristics are in conformity with the requirements of the present invention.

For the sake of example one form of power plant according to the invention will now be described with reference to the accompanying drawings, in which.

The engine is of a design suitable for road vehicle propulsion, and in general arrangement comprises a centrifugal compressor A driven by a turbine B on a common shaft therewith, and an independently rotatable power turbine C mounted on a shaft at right angles to, and non-intersecting with, the common shaft of the compressor and its driving turbine. The compressed working fluid is preheated in a heat exchanger D utilizing the engine exhaust gases, and further heated by burning fuel in a single combustion chamber E located, as respects the flow of working fluid, between the heat exchanger and the compressor driving turbine. The engine may be supported in any one of various positions, but one disposition which would be convenient for a road vehicle chassis is with the said common shaft extending vertically and the shaft of the power turbine extending horizontally, say longitudinally of the chassis.

Referring to the Figures 4–9, the impeller 1 of the single sided centrifugal compressor A takes in air through a central "eye" 2 and delivers into a free (i. e. vaneless) diffuser space 3 of which the radial dimension must be appropriate to the required compressor characteristics. From the space 3 the compressed air is discharged into a volute 4 to which is connected a duct 5 leading to the heat exchanger D where the compressed air takes up heat from the turbine exhaust gases. The compressed air leaves the heat exchanger by way of the outlet 6 and passes to the combustion system comprising a single combustion chamber E to which fuel is supplied by the inlet pipe 7 and burnt in the chamber. The fuel system is assumed to be of the well known "spill" type, and reference 8 denotes the spill line. 9 is an igniter for initiating combustion in the chamber D.

From the combustion chamber the products of combustion are led by way of a duct 10 to a volute 11 giving access to the variable-admission nozzle ring of the compressor-driving turbine B which is of the radial vaned centripetal flow type. The nozzle ring comprises a series of vanes 12 which are capable of simultaneous pivotal adjustment as explained below. The rotor 15 of the turbine B comprises radial vanes 16, from which the working fluid is discharged through a central eye 17. The rotor 15 is borne upon a shaft 18 which also mounts the compressor impeller 1.

From the eye 17 the gases discharged from the turbine B are led straight into a volute 19 giving access to the nozzle ring of the power turbine C which is of similar construction to the turbine B; i. e. it is of the centripetal flow type with a variable admission nozzle ring consisting of pivotable vanes 20, which direct the gases on to the radial vanes 21 of a rotor 22 mounted on a shaft 23. From the rotor 22 the gases are discharged through an axial outlet 24 to the heat exchanger D, whence they are exhausted via a duct 25. The disposition of the shaft 23 at right angles to, but non-intersecting with, the shaft 18, has the convenience that the duct leading to the volute 19 can be short and almost straight. From the shaft 23 the drive is taken off through a train of reduction gears 26 contained within casings 27, 28.

Figure 10:
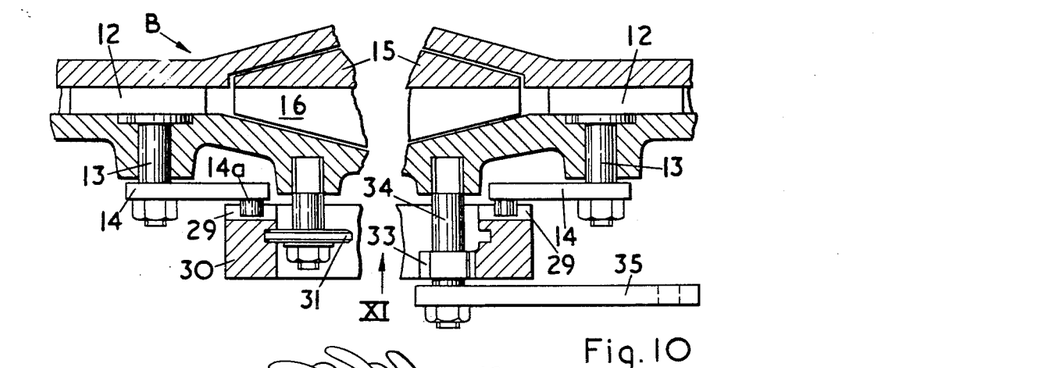
Figure 10 is an enlarged fragmentary sectional view of the compressor-driving turbine B, similar to the section as seen in Figure 7, but showing the mechanism for varying the angles of the nozzle vanes.
Figures 11, 17:
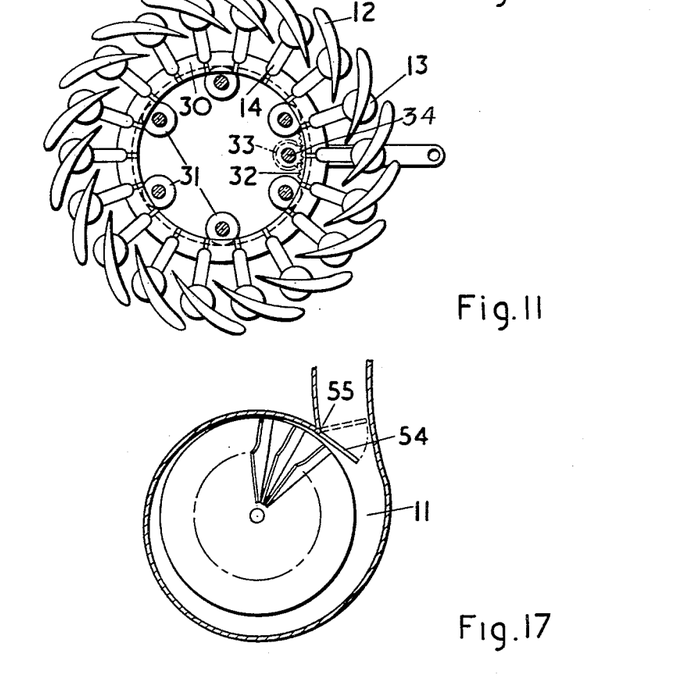
Figure 11 is a diagrammatic view of the nozzle vanes (and associated mechanism) of the turbine shown in Figure 10, looking in the direction of the arrow XI in Figure 10.
Figure 17 is a diagrammatic view showing an alternative, and simpler means for throttling the turbine nozzle.

The adjustment of the nozzle vanes of the turbine B is brought about as follows (Figures 10–11). The vanes 12 are mounted on stub pins 13 carrying short levers 14 the free ends of which have pins 14a engaging radial slots 29 in an annulus 30 supported for rotation on rollers 31. The annulus 30 has internal teeth at 32 engaged by a pinion 33 mounted on a short shaft 34 which also carries a lever 35. By the angular movement of the lever 35 the pinion 33 and annulus 30 are rotated, thus simultaneously adjusting the vanes 12.

The nozzle vanes 20 of the power turbine C are adjusted by exactly similar mechanism to that of the nozzle vanes 12 of turbine B.

Figure 12:
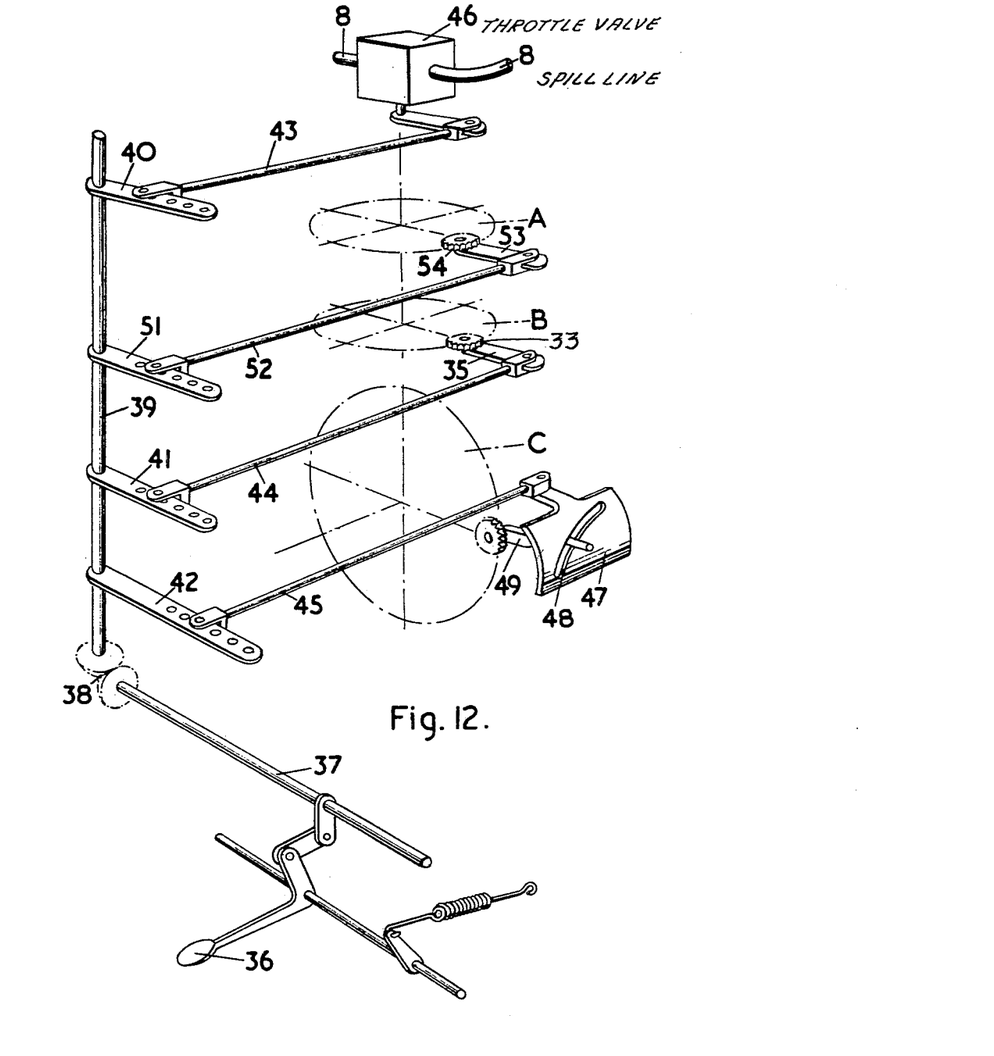
Figure 12 shows the control connections of the engine.

Figure 12 shows diagrammatically the control connection of the engine. A single accelerator pedal 36 is linked to a shaft 37 which, through bevel gears 38, rotates a shaft 39 carrying lever arms 40, 41, 42, linked respectively to rods 43, 44, 45. The rod 43 operates a throttle valve 46, located in the spill line 8, so as to vary the amount of fuel "spilled" back to the tank, and hence vary the quantity of fuel actually burnt. The rod 44 is linked to the lever 35 operating the nozzle vane adjustment of the turbine B. The rod 45 operates a movable member 47 provided with a cam-slot 48 in which rides the end of a lever 49 which adjusts the nozzle vanes of the power turbine C and corresponds in function to the lever 35.

Operation of the pedal 13 alters the fuel supplied for combustion and at the same time acts to bring about an appropriate variation in the mass flow of working fluid through both turbines.

The speed range of the compressor is relatively small, which has the further advantage that if the pedal 36 is fully depressed the plant will give full power more quickly than in an engine controlled only by fuel supply variation, in which, at low power, the compressor speed is low, and when full power is required it takes an appreciable time to "motor up" the compressor.

Moreover, less effort is required to turn over the engine for starting, because the mass flow is low at low settings of the pedal 36.

Various alternative constructions of centrifugal compressor are believed to be capable of giving a "characteristic" of the required flatness.

Figures 13, 14:
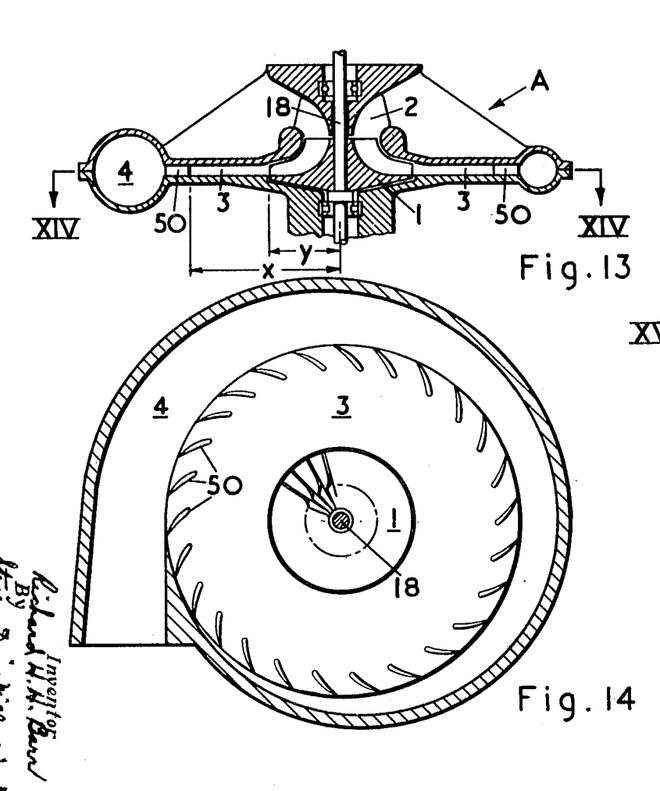
Figure 13 is a section through an alternative kind of compressor.
Figure 14 is a section on the line XIV—XIV of Figure 13.
Figure 15:
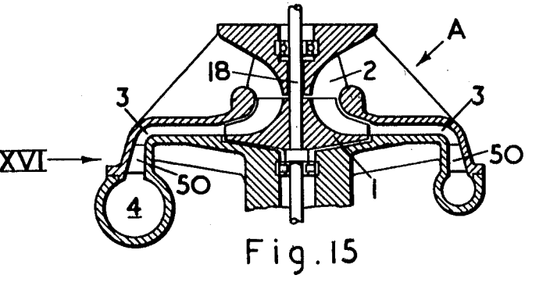
Figure 15 is a section similar to Figure 13, but showing a modification in the diffuser arrangements.
Figure 16:
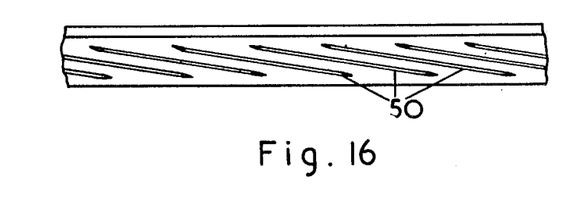
Figure 16 is a developed view of the diffuser vanes of Figure 15, taken in the direction of the arrow XVI in Figure 15.

For instance, the compressor A may comprise either of the alternative constructions of centrifugal compressor shown in Figures 13–14, and Figures 15–16. In Figures 13–14 the fluid is discharged from the rotor 1 into a primary diffusing space 3, which is vaneless, from which it enters a secondary diffuser consisting of diverging passages defined by fixed vanes 50. To save space the construction of Figures 15–16 can be adopted in which the diffuser casing is, as it were, "dished" so that the gas turns a right-angled bend before entering the volute 4. The fixed vanes 50 are located past the bend and the necessary divergence of passage is provided by the walls of the casing, the vanes 50 themselves not being divergent relative to each other (Figure 16). In constructions such as Figures 13–14 and 15–16 the vaneless space 3 is very considerably greater than the clearance space which, in a normal centrifugal compressor, must be allowed between the impeller periphery and the diffuser vanes, and must be large enough to give the required compressor characteristics. Probably it would be preferable for the outer diameter of the vaneless space to be at least twice the impeller tip diameter, i. e. in Figure 13, for the distance $x$ to be at least twice $y$.

As another alternative, the compressor A may be a centrifugal compressor of normal type, except that the diffuser vanes are pivotable to vary the cross-sectional area and configuration of the passages between them. The mechanism for moving the vanes simultaneously would be substantially the same as is shown in Figures 10 and 11, in connection with which reference should be made to the preceding description. To keep the compressor characteristic of the required form it is necessary for the cross-sectional area of the passages defined by the vanes 50 to be diminished step-by-step with reduction in fuel supply and reduction in the turbine nozzle area. In the control system as shown by Figure 12 this would be simply achieved by providing on the shaft 39 a further lever arm 51 connected to a rod 52 operating an arm 53 adapted to rotate a pinion 54 (corresponding in function to the pinion 33 of Figures 10 and 11).

Figure 17 shows a simpler means of varying the nozzle area of the turbines B or C, or both, which involves the constructional advantage of dispensing with a ring of adjustable nozzle vanes and the associated mechanism. In Figure 17, the supply of working fluid to the turbine volute 11 is throttled by a single vane or flap 54 pivoted on a stub pin 55. In this construction the velocity and direction of the gas flow to the turbine rotor is controlled only by the dimensions and configuration of the volute 11, the quantity being controlled by adjusting the flap 54 which is moved by appropriate linkage connected to the shaft 39 (Figure 12).

Figure 18:
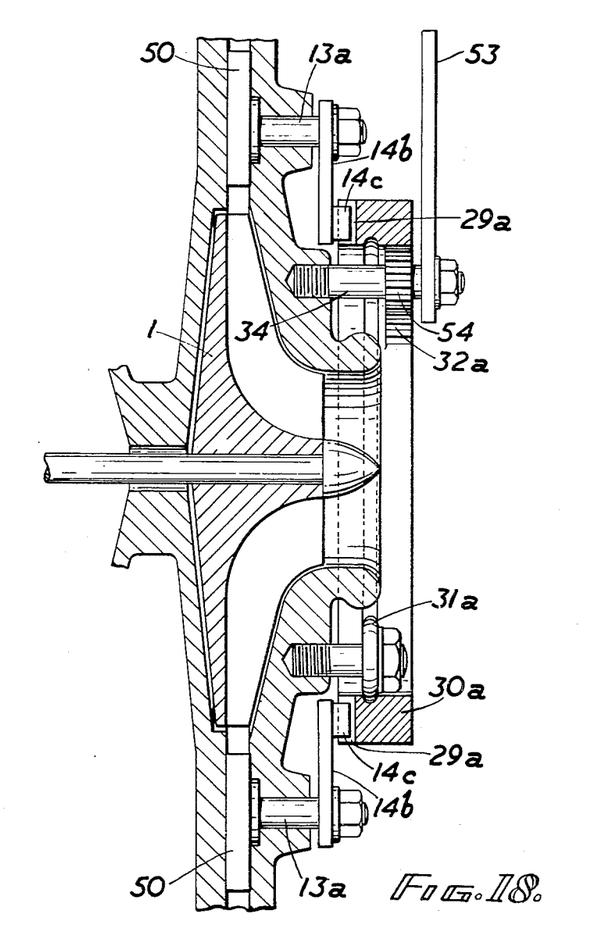
Figure 18 is an axial section through a single-sided centrifugal compressor having adjustable diffuser vanes.

Figure 18 shows the impeller 1 of the single-sided centrifugal compressor which takes in air through a central eye and delivers into an annular diffuser space containing a ring of adjustable diffuser vanes 50, the construction and operation of which as described below is identical to that disclosed in connection with the adjustable vanes shown in Figures 10 and 11.

The vanes 50 are mounted on stub pins 13a carrying short levers 14b the free ends of which have pins 14c engaging radial slots 29a in an annulus 30a supported for rotation on rollers 31a. The annulus has internal teeth 32a engaged by the teeth of a pinion 54 mounted on a stub shaft 34 the free end of which carries a radially extending lever 53. By the angular movement of the lever 53 the pinion 54 and annulus 30a are rotated to adjust simultaneously the vanes 50. The angular movement of the lever 53 is obtained on operation of the pedal 36 through the connection shown in Figure 12.

Instead of providing variable nozzle means for both turbines, it may as an alternative only be provided for one turbine (i. e. either for the compressor-driving turbine or the other turbine). The invention is thought to have some useful application to plant having only one turbine (i. e. the compressor-driving turbine), and in such a case there will necessarily be only one variable nozzle means.

It will be appreciated that the present invention, in addition to being well adapted for application to a plant layout consisting of what may be termed a single "generating unit" (i. e. compressor and compressor-driving turbine) and a single independent shaft-power turbine, is also applicable to other combinations of "generators units" and power turbines.

The present invention may be usefully applicable to gas turbine plants in general, of whatever order of power, and therefore it is not to be understood that the invention is necessarily limited to plants of relatively low power.

I claim:

1. A gas turbine power plant comprising a centrifugal compressor of which the impeller discharges into a vaneless annular diffuser space having an outer radius at least one and a half times the greatest radius of the impeller, a combustion system for the continuous burning of fuel at substantially constant pressure in a steady flow of air supplied by the compressor, a turbine system for the production of external shaft power, said turbine system consisting of at least one radial inward-flow turbine supplied directly with heat-energized gaseous fluid from the combustion system, variable-admission nozzle means associated with said turbine means for varying the quantity of fuel burnt in the combustion system, and a mechanical interconnection between the said turbine nozzle means and the fuel-varying means such that decrease in mass flow effected by the nozzle means is associated with a decrease in the fuel burnt, and vice versa.

2. A gas turbine plant according to claim 1 having a radial inward-flow turbine in driving connection with the compressor, an independently rotatable radial inward-flow turbine for supplying external shaft power, both turbines being supplied by said combustion system, variable-admission nozzle means associated with each turbine, and a mechanical interconnection between each of said nozzle means and the fuel-varying means such that decrease in mass flow effected by the nozzle means is associated with a decrease in the fuel burnt, and vice versa.

3. A gas turbine plant according to claim 2, wherein the compressor is provided with a vaned diffuser into which the fluid passes on leaving the vaneless diffuser space.

4. A gas turbine plant comprising a single sided centrifugal compressor such that at all delivery pressures up to and including the designed full pressure it can operate stably over a mass flow range extending at least down to 50% of the mass flow at the full pressure design point; a combustion system for the continuous burning of fuel at substantially constant pressure in a steady flow of air supplied by the compressor; a radial inward-flow turbine in driving connection with the compressor, and an independently rotatable radial inward-flow turbine for supplying external power, means to feed said turbines with gas by the combustion system and said turbines being arranged in series as respects the gas flow; the external-power turbine being mounted on a shaft lying at right-angles to the compressor-driving turbine shaft; a duct substantially co-axial with the shaft of the upstream turbine and connecting the outlet of that turbine with the inlet of the other; variable-admission nozzle means associated with each turbine; means for varying the quantity of fuel burnt in the combustion system; and a mechanical interconnection between the said turbine nozzle means and the fuel-varying means such that decrease in mass flow effected by the nozzle means is associated with a decrease in the fuel burnt, and vice versa.

5. A gas turbine plant according to claim 4 wherein the compressor impeller discharges into a vaneless annular diffuser space having an outer radius at least one and one-half times the greatest radius of the impeller.

6. A gas turbine plant according to claim 4 comprising a compressor having adjustable diffuser vanes, and a mechanical interconnection linking the adjustment of the diffuser vanes to the operation of the nozzle means and the fuel-varying means so that, as the mass flow varies, the diffuser vanes are adjusted to preserve stable operation of the compressor.

7. A gas turbine plant comprising a centrifugal compressor having adjustable diffuser vanes, a combustion system, a turbine system for the production of external shaft power and consisting of at least one radial inward-flow turbine, variable admission nozzle means associated with said turbine, means for varying the quantity of fuel burnt in the combustion system, means for varying the setting of the diffuser vanes, and a mechanical interconnection so linking the operation of the three said means that decrease in mass flow effected by the said nozzle means is associated with a decrease in the fuel burnt, and vice versa, and also with adjustment of the diffuser vanes so that the operation of the compressor remains stable.

8. A gas turbine plant according to claim 7, having a radial inward-flow turbine in driving connection with the compressor, an independently rotatable radial inward-flow turbine for supplying external power, and variable-admission nozzle means associated with each turbine, each nozzle means being connected by the said mechanical interconnection with the fuel-varying means and the diffuser-varying means.

9. A gas turbine plant comprising two independently rotatable turbines of the inward radial flow type arranged in series flow association, with the respective turbine shaft axes at right-angles, and a duct substantially co-axial with the shaft axis of the upstream turbine and connecting the outlet thereof with the inlet of the downstream turbine.

10. A gas turbine plant according to claim 9, wherein one of said turbines drives a compressor also forming part of the plant and the other provides power for external use.

11. A gas turbine plant according to claim 9, wherein the said turbine shaft-axes are non-intersecting.

12. A gas turbine plant comprising a centrifugal compressor such that at all delivery pressures up to and including the designed full pressure it can operate stably over a mass flow range extending at least down to 50% of the mass flow at the full pressure design point, a combustion system for the continuous burning of fuel at substantially constant pressure in a steady flow of air supplied by said compressor; ducting connecting the compressor to the combustion system; a turbine system for the production of external shaft power, said turbine system consisting of at least one radial inward-flow turbine supplied directly with heat-energized gaseous fluid from said combustion system; variable-admission nozzle means associated with said turbine; and means for varying the quantity of fuel burnt in the combustion system; control means operatively interconnecting said turbine nozzle means and fuel-varying means so that decrease in mass flow effected by the nozzle means is associated with a decrease in the fuel burnt, and vice versa.

References Cited in the file of this patent

UNITED STATES PATENTS

| 2,168,726 | Whittle | Aug. 8, 1939 |
| 2,235,588 | Potey | Mar. 18, 1941 |
| 2,285,976 | Huitson | June 9, 1942 |
| 2,361,887 | Traupel | Oct. 21, 1944 |
| 2,428,830 | Birmann | Oct. 14, 1947 |
| 2,435,836 | Johnson | Feb. 10, 1948 |
| 2,459,079 | Johnson | Jan. 11, 1949 |
| 2,477,683 | Birmann | Aug. 2, 1949 |
| 2,663,141 | Hage | Dec. 22, 1953 |

FOREIGN PATENTS

| 456,976 | Great Britain | Nov. 16, 1936 |
| 461,887 | Great Britain | Feb. 25, 1937 |